No. 756,245. PATENTED APR. 5, 1904.
W. H. LAWRENCE & R. KENNEDY.
MILKING APPARATUS.
APPLICATION FILED JUNE 11, 1902.
NO MODEL. 3 SHEETS—SHEET 1.
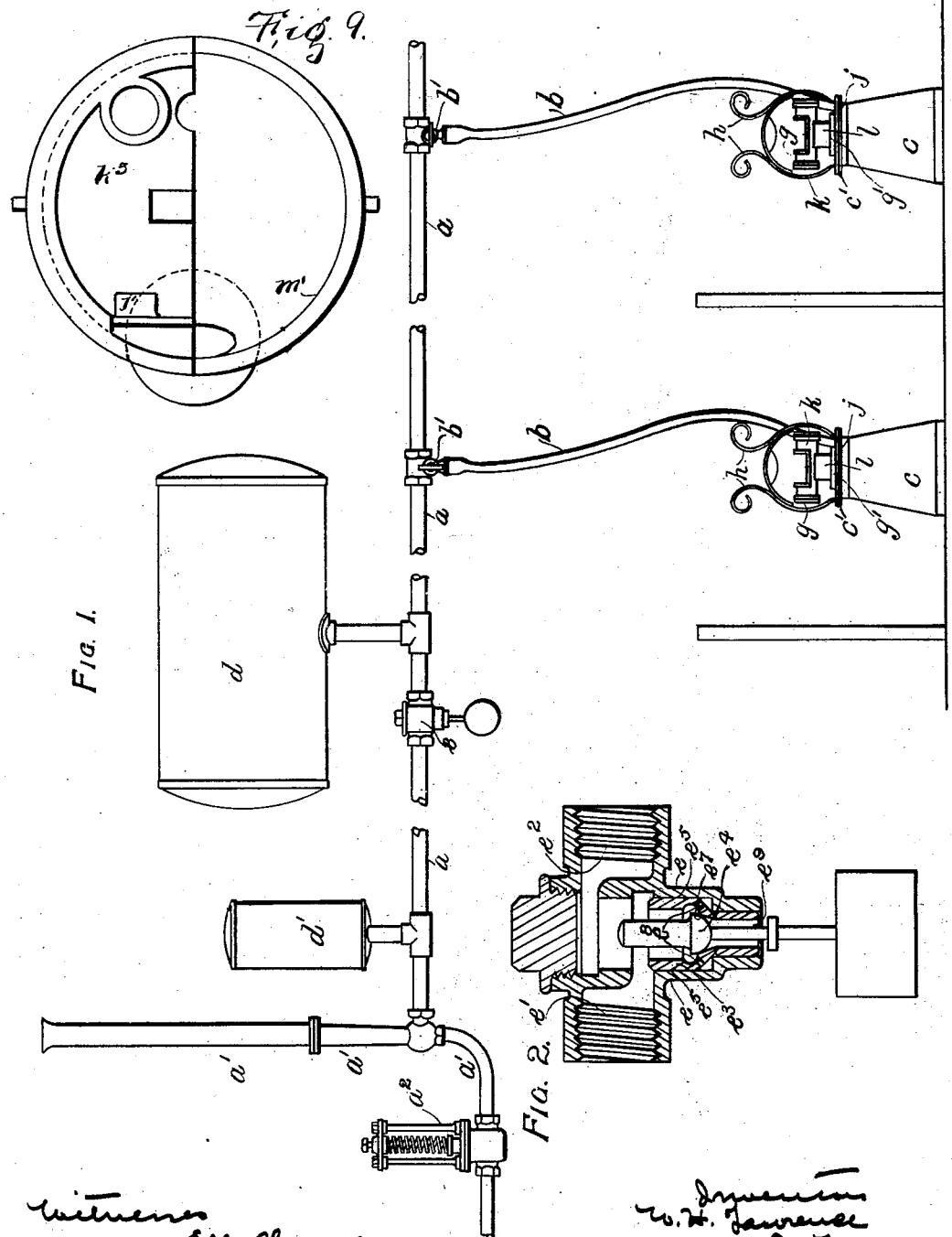

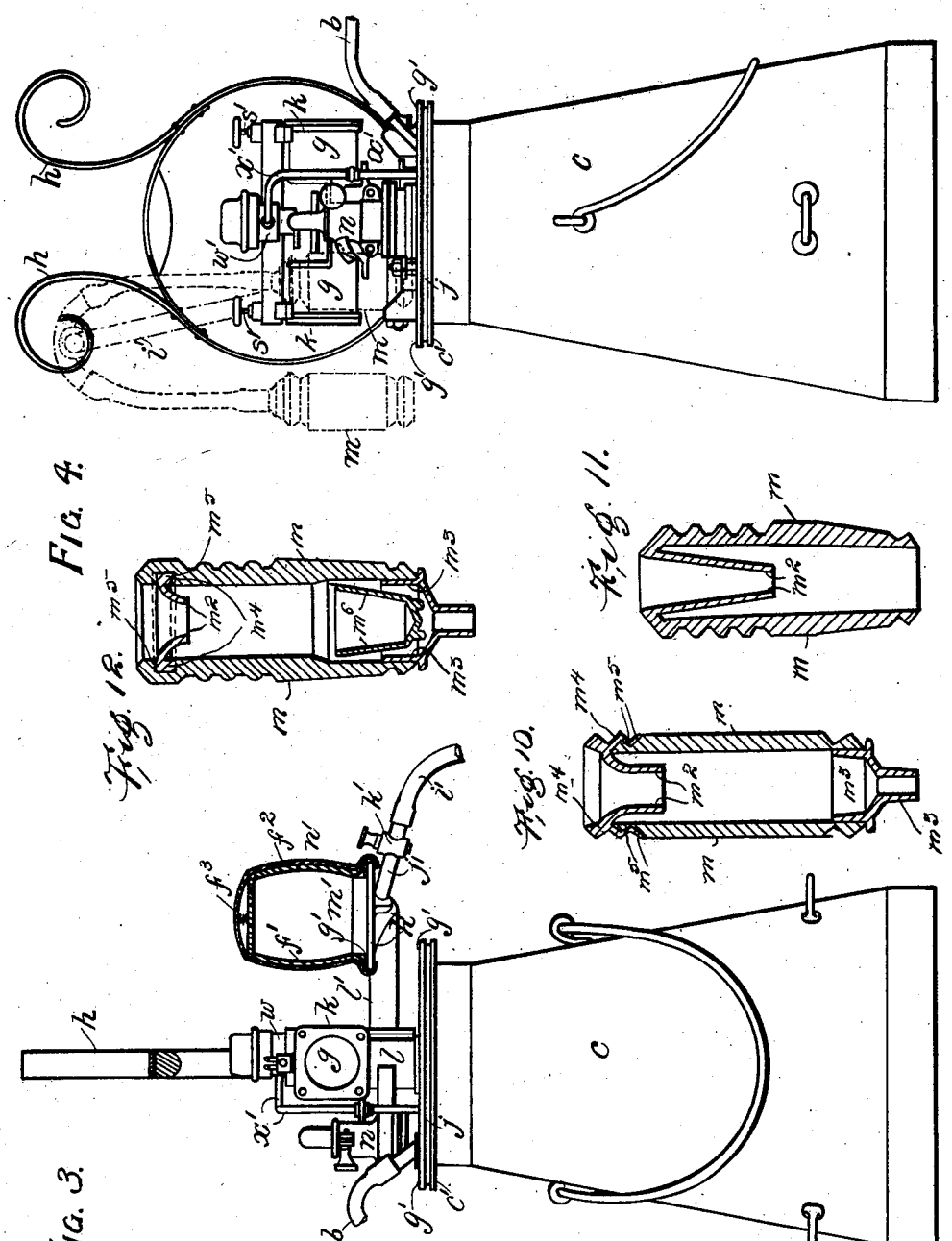

No. 756,245. PATENTED APR. 5, 1904.
W. H. LAWRENCE & R. KENNEDY.
MILKING APPARATUS.
APPLICATION FILED JUNE 11, 1902.
NO MODEL. 3 SHEETS—SHEET 3.
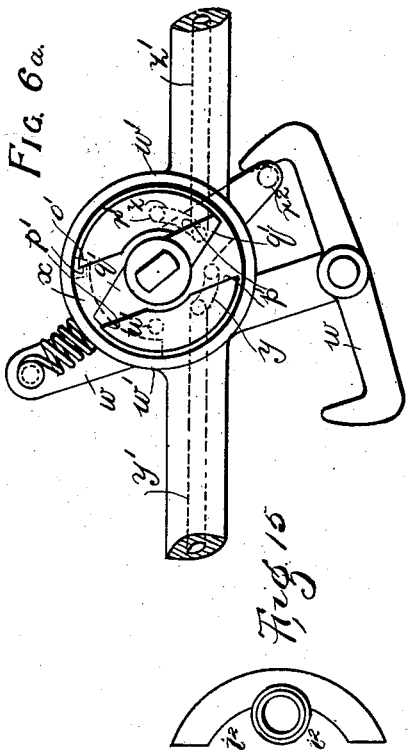
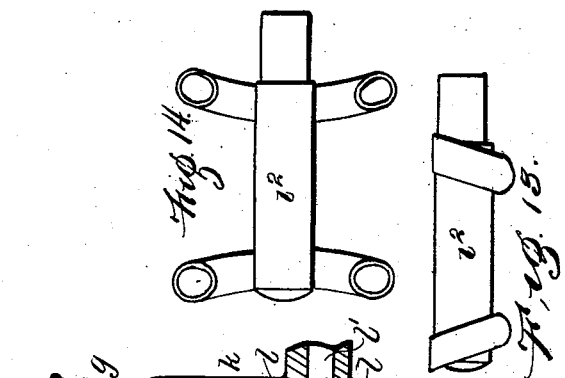
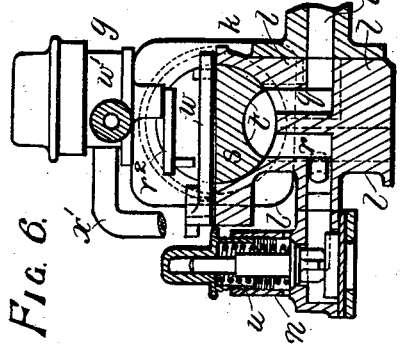
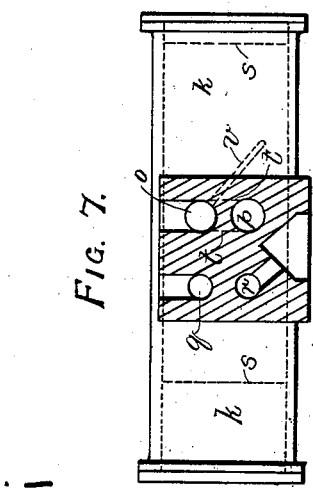
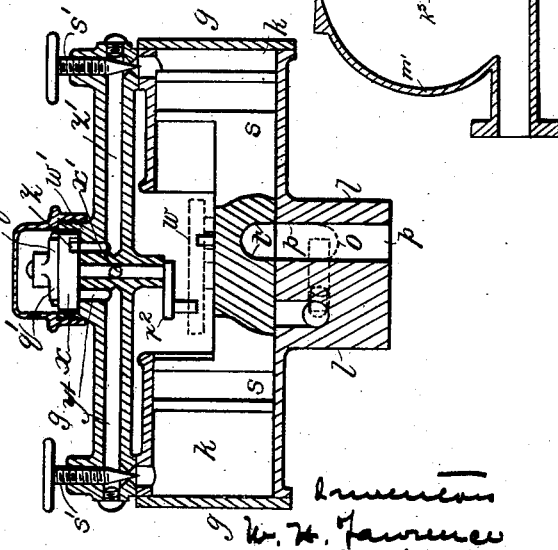
THE NORRIS PETERS CO., PHOTO-LITHO., WASHINGTON, D. C.

No. 756,245. Patented April 5, 1904.

UNITED STATES PATENT OFFICE.

WILLIAM HENRY LAWRENCE AND ROBERT KENNEDY, OF GLASGOW, SCOTLAND.

MILKING APPARATUS.

SPECIFICATION forming part of Letters Patent No. 756,245, dated April 5, 1904.

Application filed June 11, 1902. Serial No. 111,220. (No model.)

*To all whom it may concern:*

Be it known that we, WILLIAM HENRY LAWRENCE, residing at 35 Melville street, Pollokshields, Glasgow, and ROBERT KENNEDY, residing at 346 Pollokshaws road, Glasgow, Scotland, subjects of the King of the United Kingdom of Great Britain and Ireland, have invented certain new and useful Improvements in Milking Apparatus, (for which application for patent has been made in Great Britain, No. 23,353, dated November 19, 1901,) of which the following is a specification.

This invention relates to apparatus for milking cows or other animals by means of intermittent or pulsating suction and comprises the following essential parts: first, a vacuum or suction producing apparatus; second, a vacuum-regulating apparatus; third, a vacuum-storage, tubes, and fittings; fourth, a milk-receptacle in conjunction with a pulsating device, a by-pass, and inspection devices; fifth, teat-cup and connections. These several parts are arranged and connected as hereinafter set forth to form a complete milking-machine installation.

The invention is illustrated by the accompanying drawings, in which—

Figure 1 is a diagrammatic representation of an installation of the milking plant. Fig. 2 is a vertical section showing the vacuum-regulating apparatus on an enlarged scale. Figs. 3 and 4 are elevations at right angles to each other of the milk-receptacle and pulsating apparatus, showing pipe connection to the suction-producing apparatus. Fig. 5 is a longitudinal and vertical section of the pulsating apparatus. Fig. 6 is a transverse section of the pulsating apparatus. Fig. 7 is a plan view of the pulsating apparatus. Fig. 6$^a$ is an enlarged plan of the pulsating valve and casing. Fig. 8 is a section of a modified form of the inspection device, and Fig. 9 is a front elevation of the same. Figs. 10, 11, and 12 are vertical sections of three different forms of the teat-cup employed in the milking apparatus. Figs. 13, 14, and 15 are respectively elevation, plan, and end views of the five-way junction-pipe for connecting four teat-cups and the vacuum-reservoir or milk-receptacle.

As shown by Fig. 1, the milking plant comprises a main pipe $a$, which is led over the stalls for the cows and which is connected to a suction-producing apparatus, such as a pump or ejector $a'$, worked by fluid-pressure, the degree of vacuum produced being regulated so as to maintain a uniform maximum vacuum at the ejector by a pressure-reducing valve $a^2$. To the main pipe $a$ branch pipes $b$, provided with cocks, are connected at each stall and led to a milk pail or receptacle $c$, on whose lid or cover is fitted a pulsating device. Connected to the main pipe $a$ is also fitted a main vacuum-storage reservoir $d$ to further insure the maintenance of uniform vacuum, and between it and the ejector or suction-producing device is fitted a vacuum-regulating apparatus composed of a combined vacuum cut-off and relief valve $e$, which serves to prevent an excess of vacuum being produced in the main pipe and vacuum-reservoir. A smaller reservoir $d'$ is fitted on the main pipe $a$ in proximity to the ejector to lessen liability to fluctuation of the vacuum.

For the regulation of the vacuum, which is an important function in milking-machines operating by suction, we employ special vacuum-regulating apparatus, so that the vacuum acting upon the teats of the animals shall not exceed a predetermined maximum degree suitable to the animals. The apparatus which is shown at Figs. 1 and 2 is so constructed that the vacuum in the milk-receptacles when it reaches a predetermined degree operates in conjunction with the external atmospheric pressure upon a valve or valves by means of a piston or its equivalent and cuts off communication with the suction-producing apparatus $a'$, and, if required, admits air, so as to prevent a further increase of the vacuum. Normally the valve or valves are closed on their respective seats by means of a deadweight spring or weighted lever, (which are adjustable to various pressures.) As shown by Fig. 2, the valve consists of a chest $e$, having two passages $e'$ $e^2$, communicating with the suction-producer $a'$ and the milk-receptacles $c$, respectively. A portion of this valve-chest is in the form of a cylinder having two different diameters, in which are fitted the cut-off and air-admission valves $e^3$ $e^4$. The passage $e^2$ communicates with the milk-receptacles and $c'$ with the suction-producer. The central chamber $e^5$ is the cylinder in which is fitted the cut-off valve $e^3$ with its two diameters. This valve $e^3$ is hollow and carries in the center another valve $e^4$, (preferably hemispherical,) closing on its seat $e^7$, whose area is so proportioned relative to the smaller diameter of the valve $e^3$ that it does not open till the vacuum is slightly in excess of that required to move the valve $e^3$. Holes $e^8$ in the shoulder where the large and small diameters of the valve meet are provided for the purpose of allowing the vacuum to act upon both ends of the enlarged diameter and for passing air into the central chamber $e^5$, admitted at $e^9$, so that the atmospheric pressure is only effective on the area of the lesser diameter of the valve $e^3$. The action of the apparatus is threefold. First, the cut-off valve when the proper degree of vacuum has been reached moves along the cylinder $e^5$ until the annular recess communicating with the passage $e'$ is closed; secondly, if the valve $e^3$ continues to move along the cylinder by reason of the vacuum in $e$ not having been sufficiently reduced the reduced part of said valve is drawn out of its cylinder and will admit air at $e^9$; thirdly, should the cut-off valve $e^3$ fail to act the valve $e^4$ will be forced off its seat and admit air into the chamber $e^5$.

The vacuum-regulating device may be placed as shown at Fig. 1 to regulate the vacuum of the entire installation or in a sectional pipe to regulate the vacuum for part only of the installation, or it may be placed on the milk-receptacle to regulate the vacuum to suit a single cow or several cows whose milk is led into that receptacle.

The vacuum-pipe $a$ extends from the storage-reservoir connected to the suction-producing apparatus to the place where the animals are to be milked, and the branch tube connections $b$ are provided with stop cocks or valves $b'$, to which the milk-receptacles $c$ are connected by means of flexible branches $b$ during the process of milking. The stop cocks or valves $b'$, which are attached to the horizontal main vacuum-pipe on its under side, project into the pipe to about the center, thereby preventing any vapor of milk which has become condensed in the pipe $a$ from falling into the milk-receptacle when the cock is opened.

The milk-receptacle $c$, which is preferably made conical, (the base of the cone forming the bottom, while the lesser or upper end is open,) is provided with a ring or flange $c'$, which forms the seat for the pulsating device $g$. The milk receptacle or pail $c$ is also provided with handles for carrying and means for suspending it, so that it can swing clear of the floor in cases where animals from any cause are restless while being milked. Upon the open end of this milk-receptacle $c$ is placed the pulsating apparatus $g$, the base $g'$ of which constitutes the cover for the upper end of the milk-receptacle $c$, the pulsating apparatus being provided on its under side with an india-rubber ring or flange $j$. This pulsator base or cover is provided with a handle $h$ of special construction for the convenience of handling, being at two points extended into what may be termed "scroll-hooks," which, as shown in Fig. 4, are designed to carry the two sets of teat-cut pressers (shown in dotted lines) usually required for milking when not in use or when being removed from place to place.

The pulsating device $g$, which is of the portable pneumatic kind, consists of a horizontal cylinder $k$, divided by a gap into two portions and at its under side is provided with a chest $l$, furnished with ports and passages communicating with the milk-receptacle $c$, teat-cups $m$, and air-inlet valve $n$. The ports are arranged in two pairs $o$ $p$ and $q$ $r$ transversely of the axis of the cylinder $k$. The piston $s$, which is also divided into two parts by means of a gap, is provided on its under side and approximately at the middle of its length with a recess $t$. This recess $t$ is by the reciprocation of the piston $s$ in the cylinder $k$ made to connect alternately the two pairs of ports in the chest $l$, above referred to, and by that means the piston $s$ establishes alternately communication through one pair of ports $o$ $p$ with the milk-receptacle $c$ and teat-cups $m$ and through the other pair $q$ $r$ with the teat-cups $m$ and air-inlet valve $n$, provided on the chest $l$ and which is opened by the atmospheric pressure and the vacuum in the teat-cup connections. The air-inlet valve $n$ is loaded by means of a spring $u$ or weight which can be regulated to suit the minimum degree of vacuum required for retaining the teat-cups $m$ in position during the period of expansion or air admission. To provide against the minimum degree of vacuum required for this purpose falling below the predetermined amount, there is provided on the under side of the piston $s$ a shallow groove $v$, extending lengthwise, so that when the connection (by means of the recess $t$ in the piston) is established between the air-inlet valve $n$ and the teat-cups $m$ the shallow groove $v$ communicates with the milk-receptacle $c$ or source of vacuum and removes any air which through leakage or otherwise might enter at the teat-cups $m$. The same object may be effected by providing a permanent by-pass from the port $r$, communicating with the air-inlet valve $n$. The piston $s$ in its travel actuates by means of a pendulum-lever $w$, provided with tappets and springs, a cylindrical oscillating disk valve $x$, (shown particularly at Fig. 6ª,) having two recesses $y$ $z$ in its lower face so arranged as to alternately put the passage $y'$ $z'$, leading to the ends of the pulsator-cylinder $k$, into communication with a passage $x'$, communicating with the casing $w'$ of the valve $x$ and with the milk-receptacle $c$ or vacuum-space and with two other passages, $u'$ $r'$, (which are open to the atmosphere,) thereby producing reciprocation of the piston $s$, the rate of movement being regulated by means of two regulating-screws $s'$. The valve $x$ receives its oscillating movement from a crank $r^2$, fitted at its upper end with a wiper $q'$, which is sunk into a recess $p'$, cut in the back of the valve $x$. This wiper $q'$ has a certain amount of free movement in the recess $p'$, so that the crank $r^2$ can rotate a certain distance before moving the valve $x$. By this arrangement the crank $r^2$ and spring get into a position of greater turning effect before meeting with the resistance of the valve which requires to be overcome in order to effect the reciprocation of the piston $s$. A stop $o'$ is provided to prevent the valve traveling beyond its proper position.

The ports $o$ $p$ in the cylinder-chest $l$ communicate with an inspection device $n'$, and the milk which is drawn from the cow's teats by the intermittent suction, caused by the movement of the pulsator-piston $k$, passes into the milk-receptacle $c$ by way of this inspection device $n'$, the ports $o$ $p$ in the cylinder-chest $l$, and the recess $t$ in the piston $s$, respectively. The object of the inspection device $n'$ is to furnish means for seeing when milk is being taken from the animals, and in one form it consists of a bowl-shaped piece $m'$, connected by a hollow stem $l'$ to the ports $o$ and $q$ in the cylinder-chest $l$ and provided with stop-cocks $k'$ and nipples $j''$, to which the flexible pipes $i'$, connected with the teat-cups $m$, are attached. This bowl-shaped piece $m'$ is provided with a flange $h'$, furnished with an india-rubber ring $g'$, on which rests the open end of a dome or cover $f'$, of glass or other transparent material. The dome $f'$ is protected from injury by a cage $f^2$, of wirework, which is by means of clasps or hooks formed on its open end and attached to the flange $h'$ of the bowl $m'$ and at its upper end is provided internally with a spring $f^3$, which presses the dome against the joint-ring $g'$ of the flange $h'$.

In another form of inspection device, (shown at Figs. 8 and 9,) in which the milk drawn from different animals is more easily distinguished, the bowl-shaped piece $m'$ is turned edgewise and provided with a cover $k^3$, upon which is mounted the stop-cock $k'$ and nipples $j''$, to which the teat-cups are attached. Interposed between the said stop-cocks $k'$ and nipples $j''$ is a glass cylinder or tube $k^2$, (shown in dotted lines at Fig. 8,) of transparent material, through which the milk flows on its way to the milk-receptacle.

The teat-cup, as shown at Figs. 10, 11, and 12, consists of an outer and inner sleeve $m$ $m^2$, of flexible elastic material, such as india-rubber. The wall of the outer sleeve $m$ is made of sufficient thickness to resist the external pressure of the atmosphere without collapsing when the vacuum of about four inches is created inside, and the inner sleeve $m^2$ is made thin that it will easily stretch to admit a cow's teat. The sleeves may be either parallel, as shown at Fig. 10, or the inner one may taper lengthwise, as shown at Figs. 11 and 12, and they are jointed together removably or permanently at one end to form what may be termed the "mouthpiece." The open or lower end of the outer sleeve $m$ is closed by means of a reducing-nozzle $m^3$ for the purpose of connecting the cup to the flexible connection $i'$, leading to the milk-receptacle $c$ by way of the inspection device $n'$. Externally the outer sleeve $m$ is at both ends provided with a V-shaped groove surrounding it circumferentially, the object of the groove being to give freedom to the intermediate parts of the sleeve to collapse and expand under the influence of the variations of the vacuum internally effected by the pulsating apparatus. The inner and outer sleeves $m^2$ $m$ may be made integal, as shown at Fig. 11, or separate, as at Figs. 10 and 12, in which latter case they can be attached to each other by means of a flange or apron $m^4$, provided on the inner sleeve $m^2$, which fits into the V-shaped groove $m^5$ on the outer sleeve, as shown at Fig. 10, or the inner sleeve or diaphragm $m^2$ may, as shown at Fig. 12, be secured with a dovetailed groove $m^5$, formed within the outer sleeve $m$. The outer sleeve $m$ may be made, as shown at Figs. 11 and 12, with ridges surrounding it circumferentially, as thereby giving a maximum of strength to resist external pressure with a minimum weight of material.

To prevent a cow's teat blocking the milk-discharge in the nozzle $m^3$, a kind of thimble $m^6$ is provided, termed an "overflow-cup," into which the milk first enters till the thimble is filled, when it overflows and passes out through the milk-discharge $m^3$ to the milk-receptacle $c$. By this means the cow's teat is during the operation of milking partly immersed in the warm milk, which favors the milking process in some animals.

A set of four teat-cups are connected by short flexible tubes to a five-way branch piece $i^2$, (shown at Figs. 13, 14, and 15,) termed a "claw," from which a single pipe conducts the milk through the inspection device $n'$ in its passage to the milk-receptacle $c$. This five-way piece $i^2$ is of special construction, and the four branches are so arranged as to occupy the least possible space vertically and to give equal freedom in every branch for the milk to flow into the main conductor.

The milking plant being portable, an entire installation may be mounted upon a motor-vehicle or other vehicle, which may be wheeled into a field or inclosure where the cows may be milked.

Having now described the invention, what we claim, and desire to secure by Letters Patent, is—

1. In milking apparatus, the combination with a milk-receptacle, of a pulsating apparatus mounted upon the cover of the milk-receptacle and communicating therewith, a vacuum-regulating device in communication with the milk-receptacle, a suction-producing apparatus in communication with the vacuum device, a pressure-reducing valve in communication with the suction-producing apparatus for maintaining constant pressure therein, a vacuum-reservoir in connection between the suction-producing apparatus and the vacuum-regulating device, a vacuum-reservoir in connection between the vacuum-regulating device and the pulsating apparatus, an inspection device in communication through the pulsating apparatus with the milk-receptacle, and teat-cups in communication with the inspection device.

2. In milking apparatus of the kind set forth, the combination with a pulsating apparatus comprising a cylinder having two pairs of ports and a piston adapted to reciprocate in the said cylinder having a recess in its lower face arranged to make connection first between one of the pairs of ports and then between the other as the piston reciprocates, of an inspection device in connection with one of the ports of one pair and a milk-receptacle in connection with the other port of the same pair, teat-cups in connection with the inspection device, of an inlet-valve in connection with one of the ports of the other pair and the inspection device in connection with the other port of the said other pair, said piston having on its under side a shallow longitudinal groove communicating with the port leading to the milk-receptacle and the port leading to the inspection device, so that when the connection by means of the recess in the piston is established between the air-inlet valve and the inspection device, the shallow groove will communicate with the milk-receptacle and the inspection device.

3. For use in milking apparatus a teat-cup comprising an outer flexible sleeve, a removable sleeve of similar material fitted on said outer sleeve and having an inner conical downwardly-projecting portion adapted to embrace the teat and permit of independent collapse of the outer sleeve, and a discharge-nozzle on the opposite end of the outer sleeve constructed to prevent the cow's teat from blocking the discharge-outlet substantially as described.

4. Vacuum-regulating apparatus for use in milking-machines comprising in combination with a suction-producer and a milk-receptacle a valve-chest $e$ having two passages $e'$ and $e^2$ communicating with the suction-producer and milk-receptacle respectively, a portion of this valve-chamber being in the form of a cylinder having two diameters, a hollow cut-off valve $e^3$ fitted in said valve-chamber likewise having two diameters, an air-admission valve $e^4$ carried in the center of the valve $e^3$ whose area is so proportioned relatively to the smaller diameter of the valve $e^3$ that it does not move until the vacuum thereupon exceeds that required to move the valve $e^3$, orifices $e^8$ being provided in the latter at the junction of its two diameters as and for the purpose set forth.

In witness whereof we have hereunto set our hands in presence of two witnesses.

WILLIAM HENRY LAWRENCE.
ROBERT KENNEDY.

Witnesses:
WALLACE FAIRWEATHER,
JNO. ARMSTRONG, Jr.